(12) United States Patent
Ootake et al.

(10) Patent No.: US 8,481,464 B2
(45) Date of Patent: Jul. 9, 2013

(54) SPACER MEMBER REDUCING FRETTING WEAR AND FASTENED STRUCTURES USING SPACER MEMBER

(75) Inventors: Naoto Ootake, Yokosuka (JP); Makoto Matsuo, Yokohama (JP)

(73) Assignee: Imott Corporation, Kanagawa (JP)

( * ) Notice: Subject to any disclaimer, the term of this patent is extended or adjusted under 35 U.S.C. 154(b) by 289 days.

(21) Appl. No.: 12/738,496

(22) PCT Filed: May 23, 2008

(86) PCT No.: PCT/JP2008/059958
§ 371 (c)(1),
(2), (4) Date: Apr. 16, 2010

(87) PCT Pub. No.: WO2009/050914
PCT Pub. Date: Apr. 23, 2009

(65) Prior Publication Data
US 2010/0234255 A1    Sep. 16, 2010

(30) Foreign Application Priority Data
Oct. 19, 2007  (JP) .................................. 2007-272829

(51) Int. Cl.
*F16C 33/16* (2006.01)
(52) U.S. Cl.
USPC .......................................... 508/109; 508/591
(58) Field of Classification Search
USPC ......................................... 508/105, 109, 591
See application file for complete search history.

(56) References Cited

U.S. PATENT DOCUMENTS

| 4,842,338 A | 6/1989 | Grubisic et al. |
| 6,357,923 B1 | 3/2002 | Sato et al. |

FOREIGN PATENT DOCUMENTS

| CN | 1424453 A | 6/2003 |
| CN | 1492072 A | 4/2004 |
| JP | 2000-240667 | 9/2000 |
| JP | 2003-147525 | 5/2003 |
| JP | 2003-254340 | 9/2003 |
| JP | 2003247691 A * | 9/2003 |
| JP | 2003-301847 | 10/2003 |

(Continued)

OTHER PUBLICATIONS

International Search Report of corresponding PCT/JP2008/059958, dated Aug. 19, 2008.

(Continued)

*Primary Examiner* — Jim Goloboy
(74) *Attorney, Agent, or Firm* — Christie, Parker & Hale, LLP

(57) ABSTRACT

The present invention relates to a spacer member reducing fretting wear and fastened structures using a spacer member, furthermore, the present invention provides a spacer member 1 sandwiched between contact surfaces 7 of contact materials 6 subject to abrasion and suffering from wear and provided with sliding and vibrating surfaces 2, 2 characterized in that the sliding or vibrating surfaces (2, 2) of the spacer member 1 have a higher hardness than at least one of the contact surfaces (7) of the first contact material (6) and the second contact material (6') and the sliding or vibrating surfaces (2, 2) of the spacer member 1 have a lower coefficient of friction and a higher flatness than at least one of the contact surfaces (7) of the first contact material (6) and the second contact material (6'), whereby the sliding or vibrating surfaces 2, 2 of the spacer member 1 do not easily wear down the contact surfaces 7 of the contact materials 6.

6 Claims, 21 Drawing Sheets

FOREIGN PATENT DOCUMENTS

| | | | |
|---|---|---|---|
| JP | 2003301847 A | * | 10/2003 |
| JP | 2004-68835 | | 3/2004 |
| JP | 2007-083826 | | 4/2007 |
| RU | 2 019 742 C1 | | 9/1994 |
| RU | 2 243 424 C2 | | 12/2004 |
| SU | 236130 | | 1/1969 |
| WO | WO 2006/095907 A1 | | 9/2006 |

OTHER PUBLICATIONS

International Witten Opinion of corresponding PCT/JP2008/059958, dated Aug. 19, 2008, and Translation of Reply.

International Witten Opinion of corresponding PCT/JP2008/059958, dated Sep. 29, 2009, and Translation of Reply.

International Preliminary Examination Report of corresponding PCT/JP2008/059958, dated Dec. 22, 2009.

Office action dated Jun. 17, 2011 for corresponding Russian Application No. 2010119958/12, including english translation stating relevance of SU236130 on p. 2; 8pp.

Extended European Search Report for corresponding European Patent Application No. 08764877.0, dated Oct. 19, 2011, 5pp.

Miyoshi, K.; "Sliding wear and fretting wear of diamondlike carbon-based, functionally graded nanocomposite coatings"; Wear 225-229; 1999; pp. 65-73.

Wang, J.S. et al.; "The mechanical performance of DLC films on steel substrates"; Thin Solid Films 325; 1998; pp. 163-174.

* cited by examiner

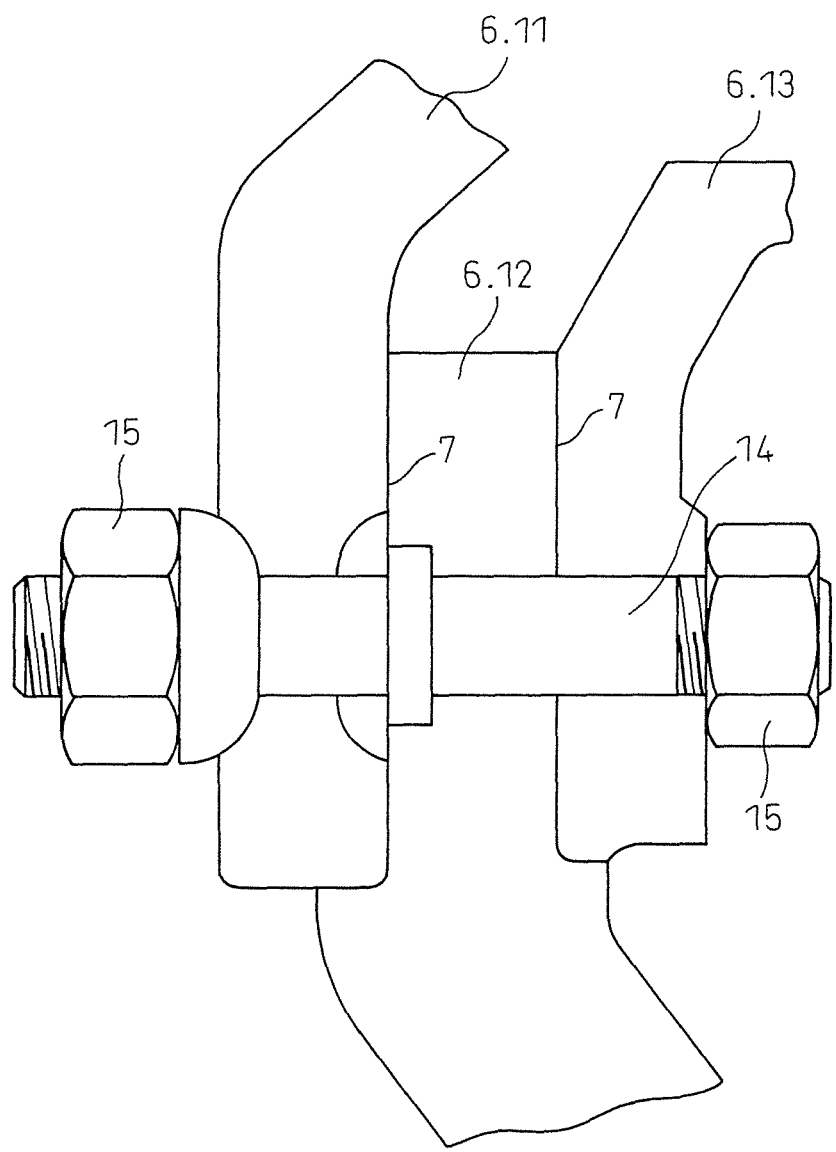

Fig. 2(b)(1)
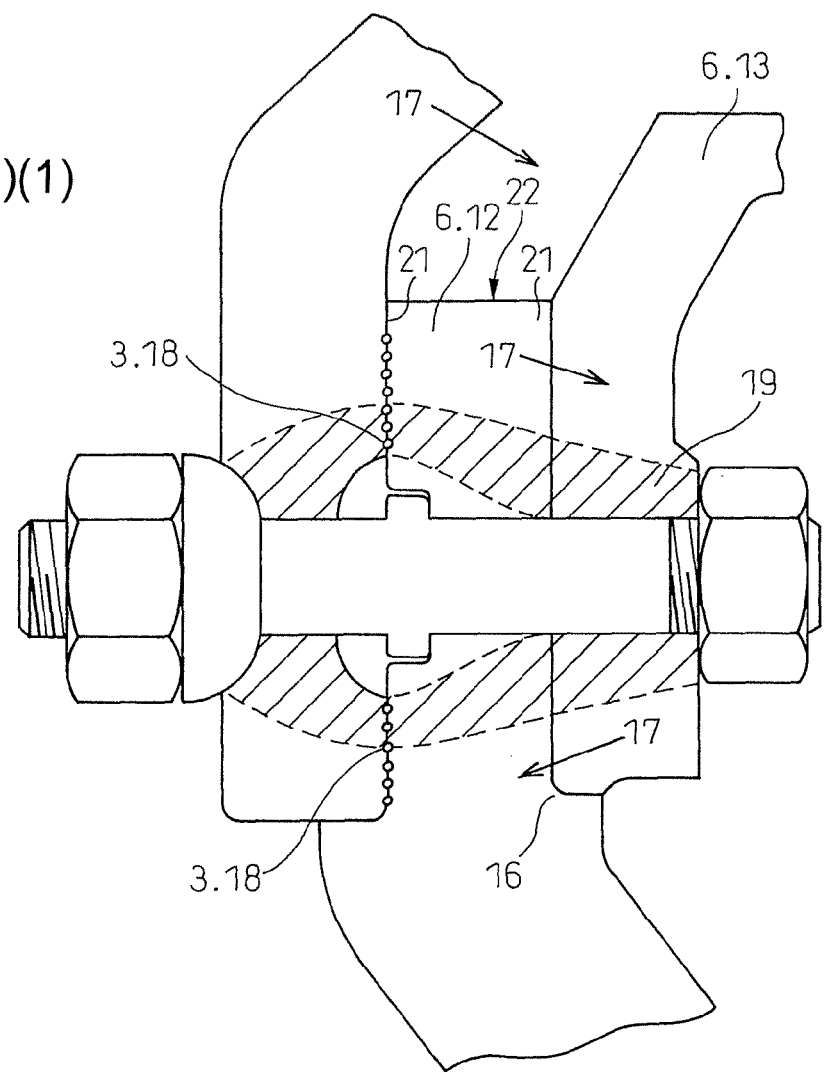
Fig. 2(b)(2)
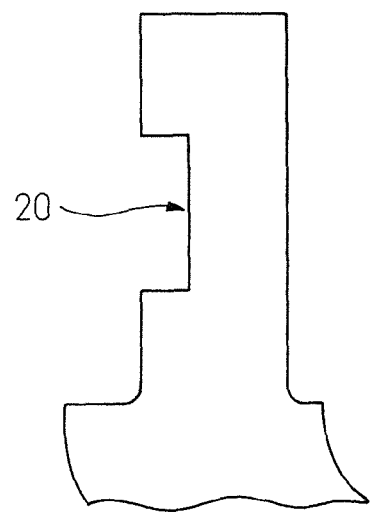

Fig. 7(a)
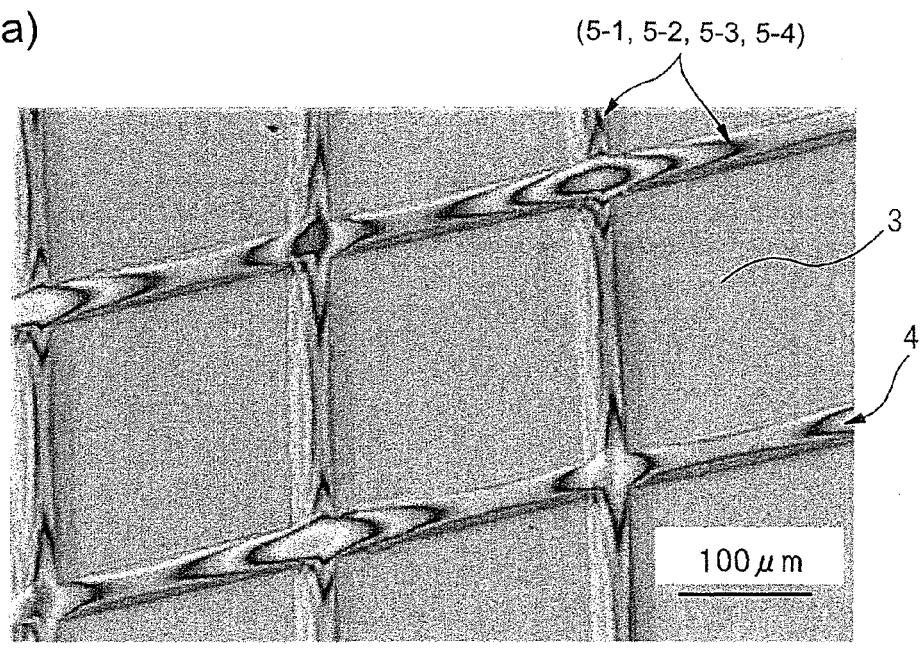
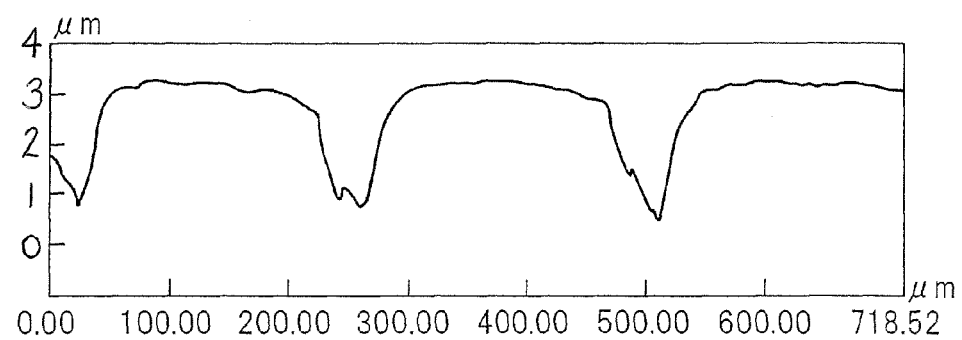
Fig. 7(b)

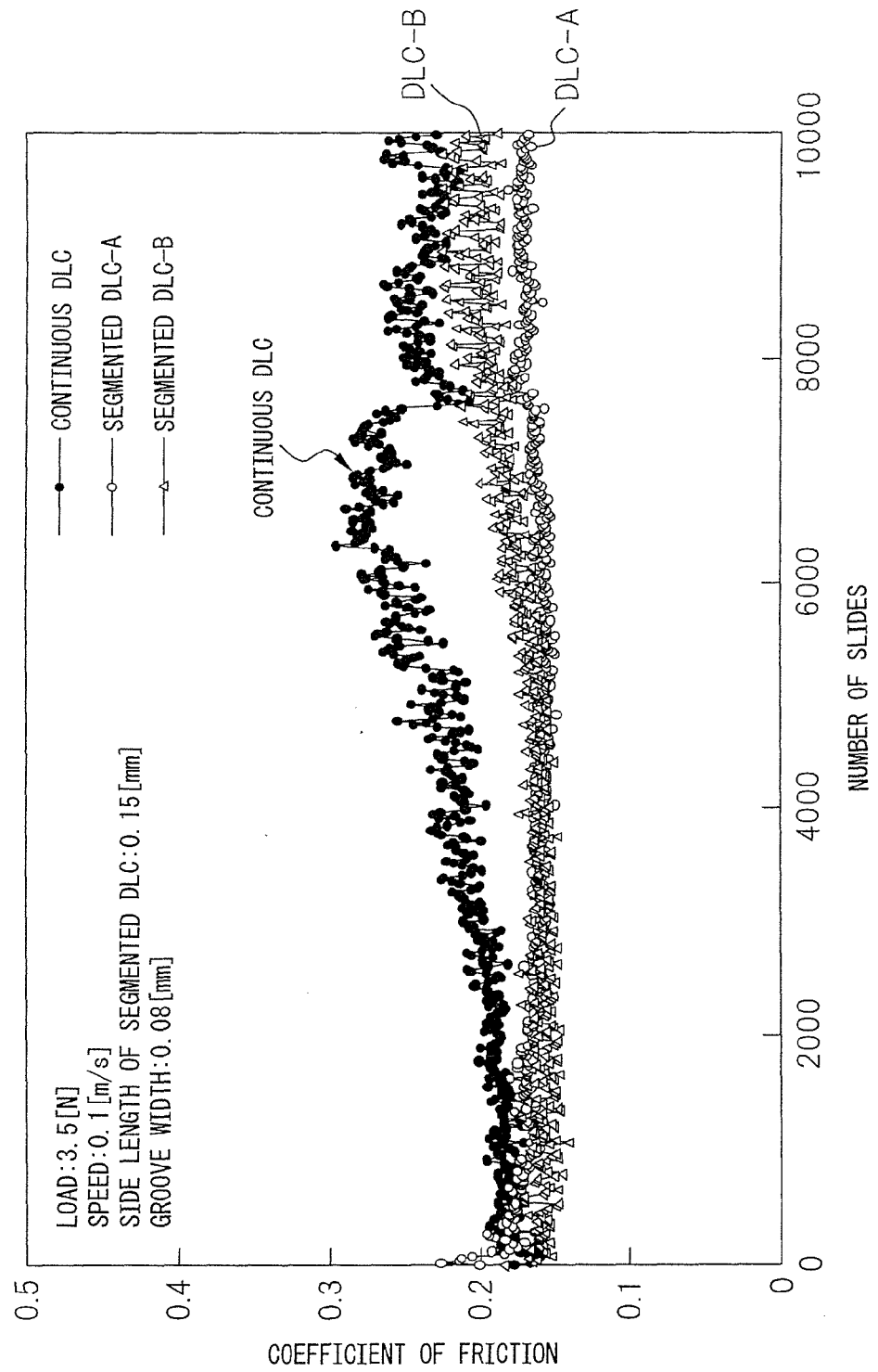

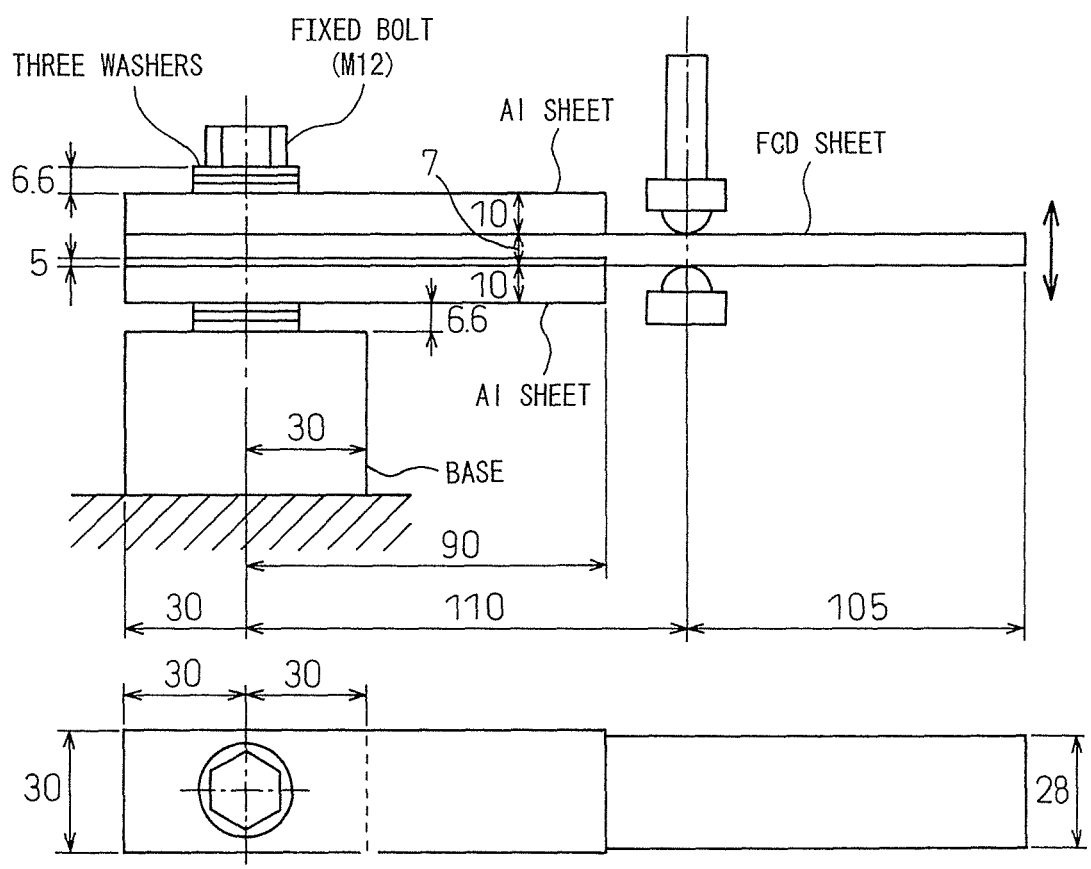

CONTINUOUS FILM DLC SHIM

SEGMENTED DLC SHIM

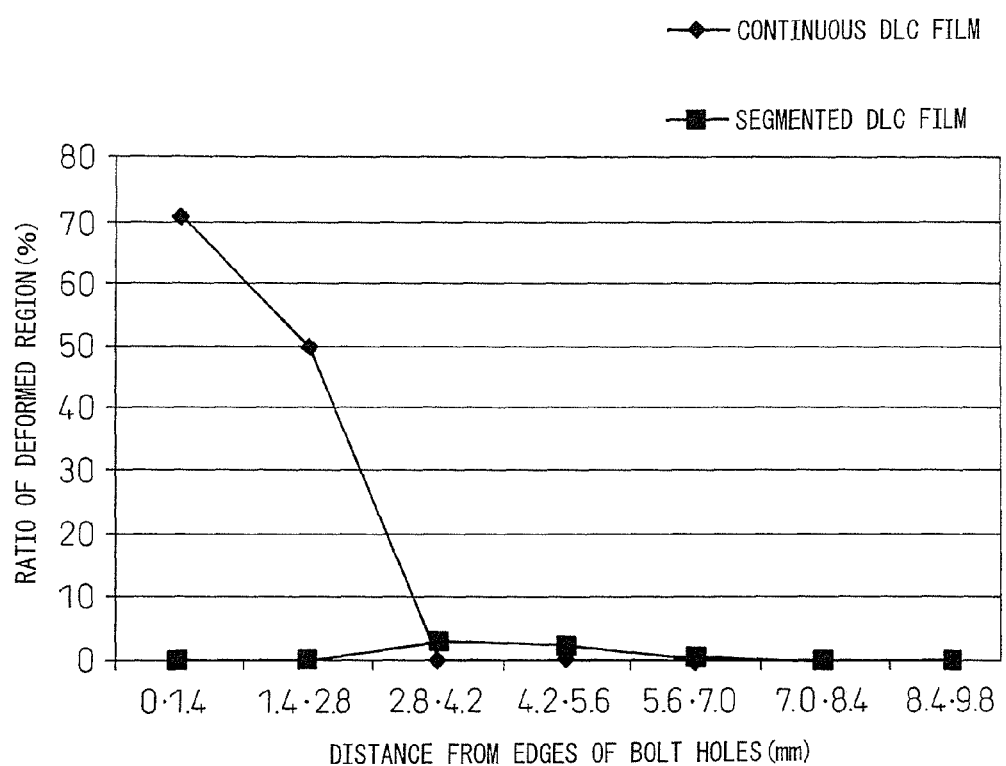

Fig. 13(a)
Fig. 13(b)
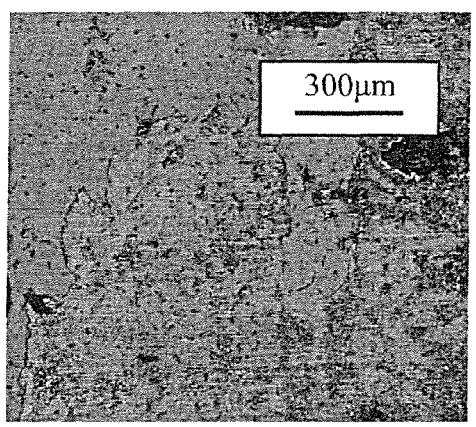
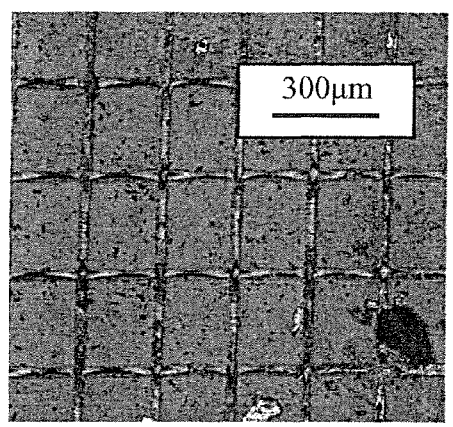
Fig.14
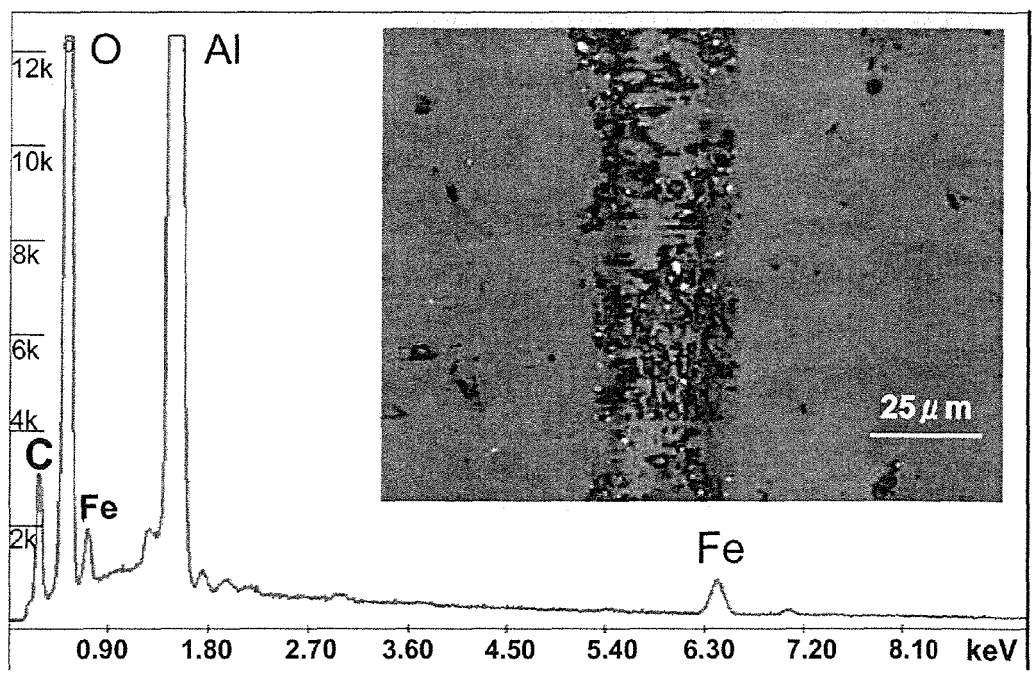

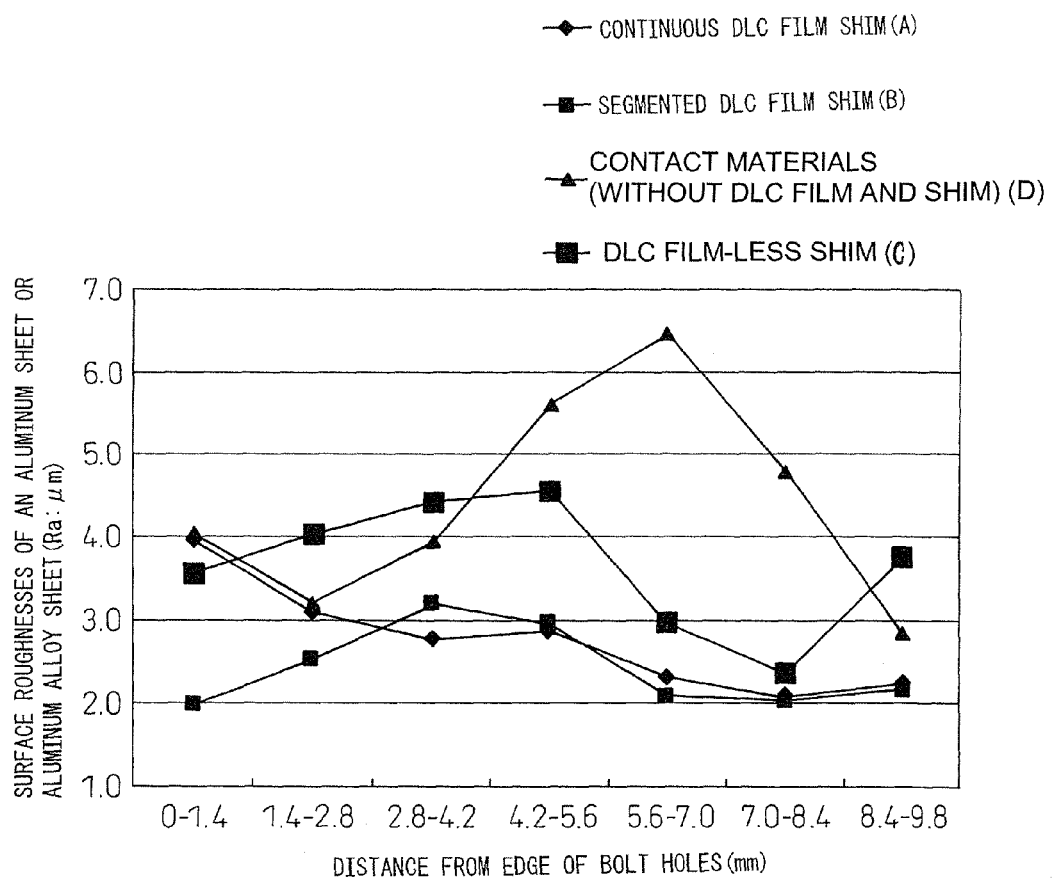

SPACER MEMBER REDUCING FRETTING WEAR AND FASTENED STRUCTURES USING SPACER MEMBER

CROSS-REFERENCE TO RELATED APPLICATION(S)

This application is a National Phase Patent Application and claims the priority of International Application Number PCT/JP2008/059958, filed on May 23, 2008, which claims priority of Japanese Patent Application Number 2007-272829, filed on Oct. 19, 2007.

TECHNICAL FIELD

The present invention relates to a spacer member for reducing fretting wear and fastened structures using a spacer member. Furthermore, specifically the present invention relates to a spacer member reducing abrasion at one structure or both structures occurring due to rubbing when component structures slide or vibrate with respect to each other. Further, the present invention relates to fastened structures using a spacer member at the sliding and vibrating surfaces of the structures.

BACKGROUND ART

Fretting wear is one type of wear. This fretting wear indicates the wear when sliding or vibrating surfaces of fastened parts of a structures abrade due to fine vibration of the sliding or vibrating surfaces of the structures in the state where the sliding or vibrating surfaces of the structures continuously receive fine vibration while receiving pressure. Therefore, it is difficult to judge the state of advance of this fretting wear from the appearance of these structures. Further, due to the differences in the environments in which the fastened parts of these structures are placed, the degree of wear of the fretting wear often differs. Usually, fastened parts of structures are retightened based on the state of use of the structures, but fretting wear has little effect. Depending on the state of advance of fretting wear of structures, this leads to the structures themselves fracturing.

Locations of structures susceptible to fretting wear are locations where the structures are pressed against each other by a strong pressure, that is, sliding or vibrating surfaces of the structures with strong fastening force. Furthermore, it is known that when members of structures receive fine vibration, regardless of whether the direction of this sliding or vibration is a direction parallel to or vertical to the sliding or vibrating surfaces or a composite of the same, wear occurs particularly easily inside the fastening force lines (the range affected by the force fastening the head of a bolt with the nut represented by the lines).

If giving an example where fretting wear easily occurs, structures such as automobiles and other vehicles receive sliding or vibration from the ground continuously while running. The sliding or vibration can also be called "fine vibration". In automobiles and other vehicles, the sliding or vibration from the ground is transmitted to a passenger through the tires, tire wheels, hubs, chassis, suspension, shock absorbers, body, cabin, seat, etc. in that order. In automobiles and other vehicles, the tires absorb vibration, but most of the vibration is transmitted from the tire wheels to the hubs and brake drums. Further, an automobile runs utilizing force generated by the engine, so vibration of the engine etc. is transmitted to the drive system and further transmitted through the hubs to the tire wheels, tires, and ground. The tire wheels and hubs are structures assembled by fastening members. The fastening members of the tire wheels and hubs receive vibration of the tires, the weight of the body, and the load at the time of braking. Further, in an automobile or other vehicle etc., when turning, the steering wheel is turned and the hubs are made to face the direction of advance through the steering mechanism.

As a result, the tire wheels are also turned to the braking system side, but the vertical surfaces of the hubs also are acted on by forces by which they are turned to the braking system side. The fastened contact surfaces of the tire wheels and hubs rub against each other and fine vibration is constantly given.

In recent years, to deal with the increased weight of vehicles, efforts are being made to lighten the parts. Vehicles are increasingly being equipped with tire wheels made by aluminum (A6061). Such aluminum tire wheels oxidize at their surfaces resulting in the formation of oxide film. When part of this oxide film peels off and the base material is exposed, it further bonds with the oxygen in the air resulting in the formation of new oxide film. This oxidized aluminum is a substance called "alumina" ($Al_2O_3$) and has a hardness of HV1000 to 3000. On the other hand, the hubs are made from castings (FCD600) which are machined to the dimensions of the parts. The surfaces contacting the tire wheels are lathed to be made generally flat. However, viewed microscopically, fine grooves (stripes) are formed. Further, grooves concentric with the shaft are formed. When such aluminum tire wheels and hubs are fastened, fretting wear occurs. Alumina, which is similar to an abrasive material, is trapped in these grooves. The alumina is successively supplied from the tire wheels. As a result, the tire wheels become thinner leading to fatigue fracture.

DISCLOSURE OF INVENTION

Technical Problem

The present invention has as its object to provide a spacer member not easily wearing down the contact surfaces of finely vibrating structures so as to reduce fretting wear. Furthermore, the present invention specifically has as its object to provide a spacer member not easily wearing down the contact surfaces where structures slide or vibrate so as to reduce the abrasion of one of the structures or both of the structures.

In the present invention, the "sliding surfaces" indicate contact surfaces of mutually fastened structures moving in a rotational direction centered about the fastened parts and contact surfaces of mutually fastened structures moving in a parallel direction centered about the fastened parts. Further, in the present invention, "vibrating surfaces" mean contact surfaces of mutually fastened structures moving away from each other and pushing against each other in the substantially vertical direction centered about the fastened parts.

Therefore, the spacer member of the present invention has as its object the reduction of abrasion between structures having surfaces where the structures move in the above-mentioned rotational direction, surfaces where the structures move in the parallel direction, and surface where the structures move away from each other and push against each other in the vertical direction.

Solution To Problem

The spacer member 1 of the present invention sandwiched between contact surfaces 7 of contact materials 6 subject to abrasion and suffering from wear and provided with sliding and vibrating surfaces 2, 2 is characterized in that said sliding or vibrating surfaces (2, 2) of the spacer member (1) have a higher hardness (>HV400) than at least one of the contact surfaces (7) of said first contact material (6) and said second contact material (6') and said sliding or vibrating surfaces (2, 2) of the spacer member (1) have a lower coefficient of friction (<μ<0.3) and a higher flatness (surface roughness: Ra<6.3) than at least one of the contact surfaces (7) of said first contact material (6) and said second contact material (6'), whereby said sliding or vibrating surfaces (2, 2) of the spacer member (1) do not easily wear down the contact surfaces 7 of the first and second contact materials (6, 6').

The above spacer member preferably is one selected from among a combinations of materials such as shown in Table 1 and, when inserted between A6061 and FCD600, is particularly preferably made SUS304N2, SUS301-CSP, and SUS304-CSP.

Further, the spacer member of the present invention 1 is characterized in that the sliding and vibrating surfaces 2, 2 of the spacer member 1 are partially or completely covered by diamond-like carbon (DLC) film 3.

Further, the spacer member of the present invention 1 is characterized in that the diamond-like carbon (DLC) film 3 is covered over the sliding and vibrating surfaces 2, 2 of the spacer member 1 so that grooves 4 are provided for regular or irregular segmentation.

Further, the spacer member of the present invention 1 is characterized in that the diamond-like carbon (DLC) film 3 has at least one type of lubricating layer 5 of a solid lubricating layer 5-1, liquid lubricant 5-2, powder lubricant 5-3, and a mixed lubricant 5-4 of the solid lubricating layer and the liquid and powder lubricants on the groove 4 and sliding and vibrating surfaces 2, 2.

Further, the spacer member of the present invention 1 is characterized in that the diamond-like carbon (DLC) film 3 is covered by chemical vapor deposition CVD or physical vapor deposition PVD and the film 3 has a thickness t of 300 nanometers to 40 micrometers. Further, the diamond-like carbon (DLC) film 3 may be made a thickness of 1 to 8 micrometers considering the material of the contact material 6, pressure, and fine vibration frequency.

Further, the fastened structures of the present invention are characterized by using the spacer member for the sliding or vibrating surfaces of structures.

Advantageous Effects

The present invention provides a spacer member not easily wearing the contact surfaces where structures slide and vibrate and thereby exhibits the effects of reducing abrasion at one structure or both structures. Specifically, the present invention exhibits the effects of reducing the occurrence of wear at contact surfaces of fastened parts of an automobile or other vehicle tire wheel, hub, and brake drum.

BRIEF DESCRIPTION OF THE DRAWINGS

FIG. 1 show a structure of a tire wheel, hub, and brake drum, wherein FIG. 1(a) shows an ISO type and FIG. 1(b) shows a JIS type.

FIG. 2 show the structure of the tire wheel, hub, and brake drum showing the range of fastening force lines at the time of initial wear when fastening a brake drum to a root of a hub and the direction of action of the fastening force, wherein

FIG. 3 show locations where wear, that is, so-called fretting wear, easily occurs conceptually by hatching, wherein

FIG. 4 show the parts of a structure of a tire wheel, hub, and brake drum where the stress becomes greatest when receiving stress from the outside to the inside of the body, wherein

FIG. 5 show the spacer member of the present invention sandwiched between the contact surfaces of the contact materials, that is, the tire wheel and hub and the hub and brake drum, wherein

FIG. 7 show a segmented DLC film covered on the spacer member of the present invention, wherein (a) shows an electron micrograph and (b) shows a cross-sectional shape.

FIG. 8 shows the relationship between the number of rotations and slides and coefficient of friction of segmented covered DLC film structures (segmented DLC-A and B) and a continuous film (continuous DLC) and shows that segmented DLC film has a coefficient of friction lower and stabler compared with a continuous film.

FIG. 9 shows a summary of a bending fatigue test method of fastened structures of the present invention.

FIG. 12 show peeling rates of continuous and segmented (segmented structure) DLC films by the distance from the edges of bolt holes.

FIG. 13 gives laser micrographs of layer peeling of a continuous DLC film (FIG. 13a) and peeling of a segmented (segmented structure) DLC film (FIG. 13b) and shows the maximum peeled parts of the two.

FIG. 14 is a photograph showing the state of wear particles obtained by a laser microscope and a view showing the results of analysis of the composition by energy dispersive X-ray photoelectron spectroscopy (EDX).

FIG. 15 shows the surface roughnesses of contact materials comprised of aluminum sheet (or aluminum alloy sheet) and iron (or alloy steel) between which a continuous DLC covered shim is provided (A) (that is, one covered by a continuous DLC film and set so that the DLC film contacts the aluminum sheet (or aluminum alloy sheet)), of these between which a segmented (segmented structure) DLC film shim is provided (B), of these two types of contact materials alone (D), and of these between which a film-less shim is provided (C).

BEST MODE FOR CARRYING OUT THE INVENTION

Figure 1A:
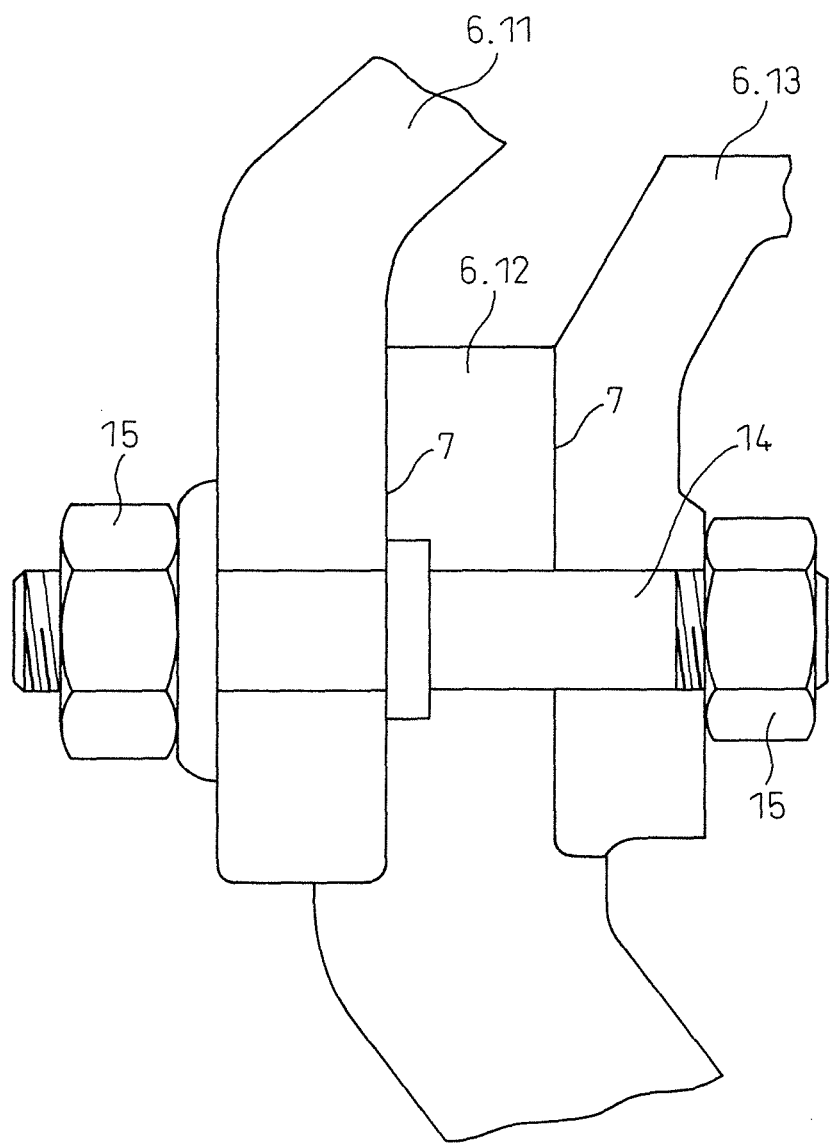

The spacer member of the present invention will be explained in detail below with reference to the example of an automobile or other vehicle tire wheel, hub, and brake drum structure. In the automobile and other vehicle tire wheel, hub, and brake drum structure, as shown in FIG. 1 to FIG. 5, the spacer member of the present invention 1 (shown in FIGS. 5(a) and (b)) is inserted between the contact surfaces 7 of the contact materials 6 of the tire wheel 11 and hub 12 and the hub 12 and brake drum 13 and is provided with sliding or vibrating surfaces 2, 2 reducing the wear on those contact material 6 (shown in FIGS. 5(a) and (b)).

Figure 2A:
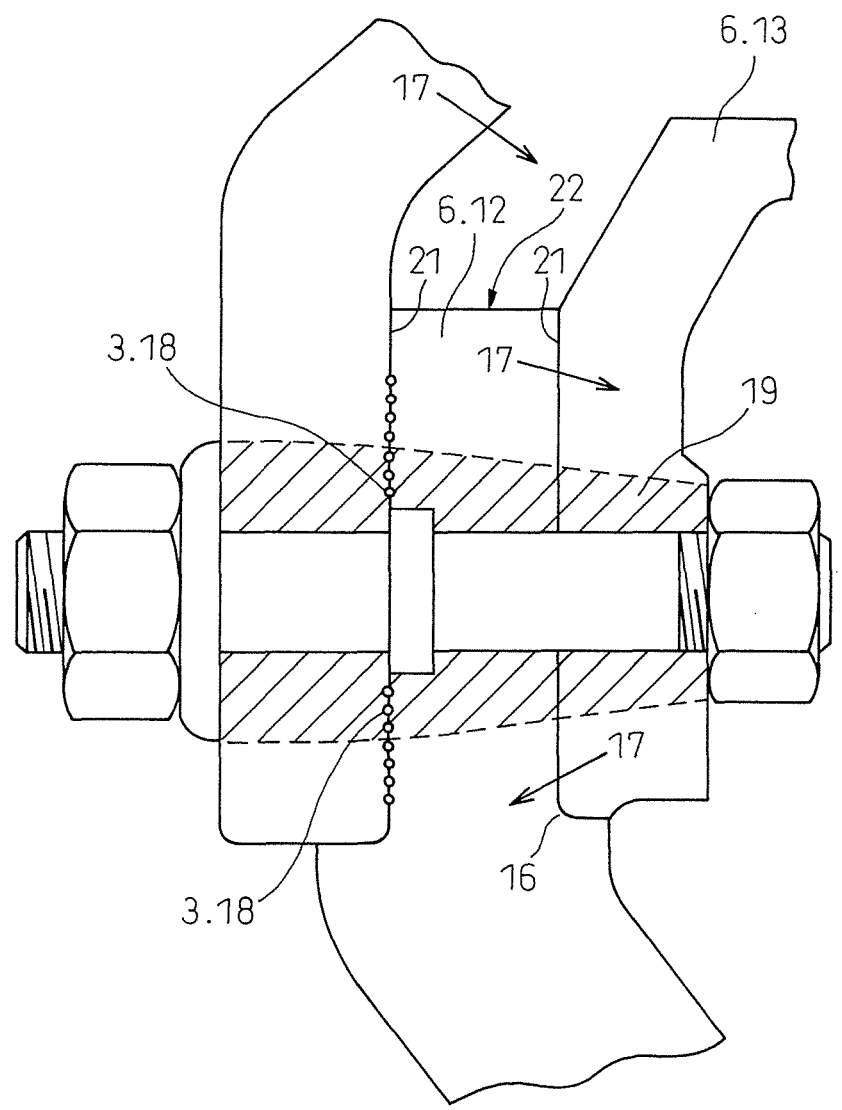
FIG. 2(a) shows an ISO type, FIG. 2(b)(1) shows a JIS type, and FIG. 2(b)(2) shows a hub alone.
Figure 4A:
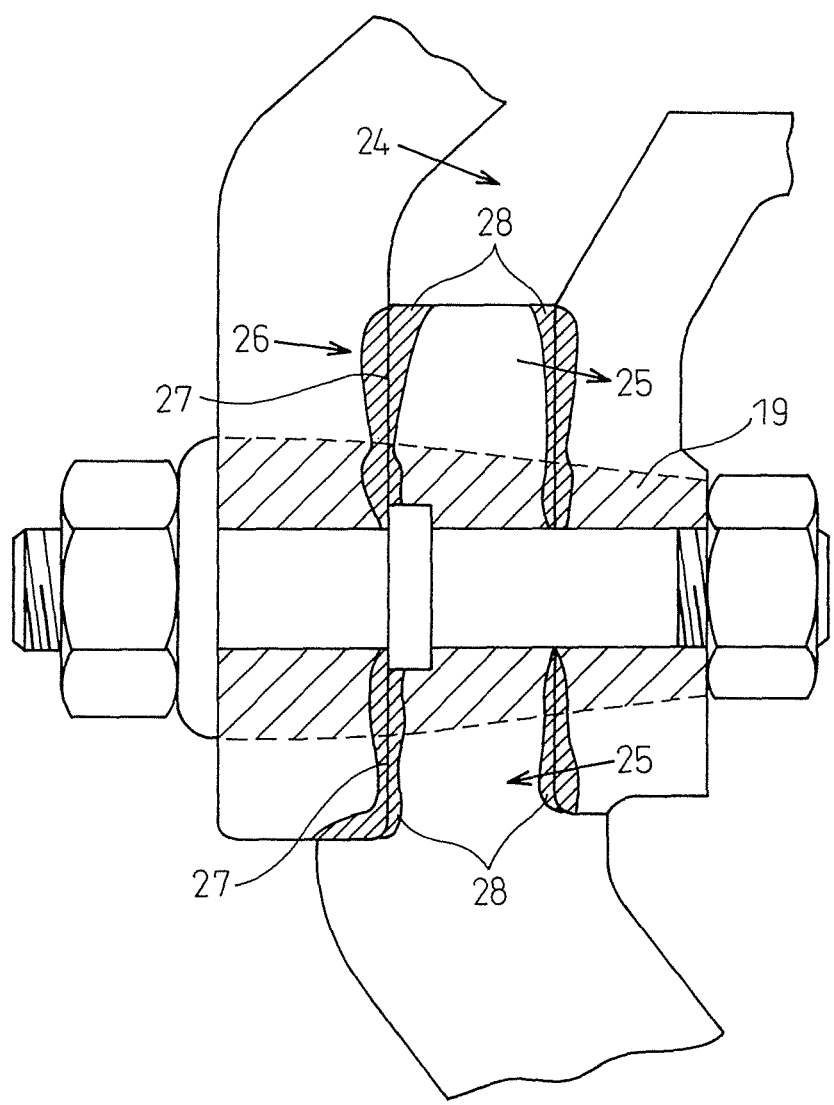
FIG. 4(a) shows the ISO type.
Figure 4B:
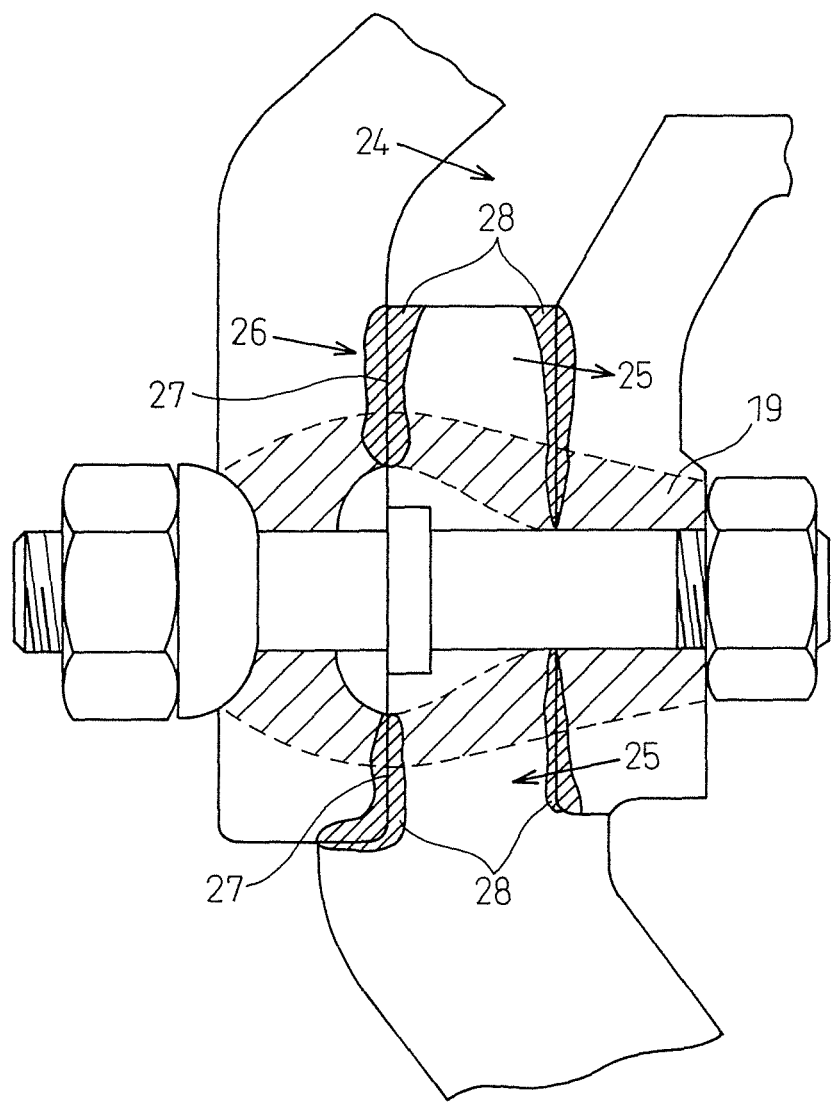
FIG. 4(b) shows the JIS type.
Figure 4C:
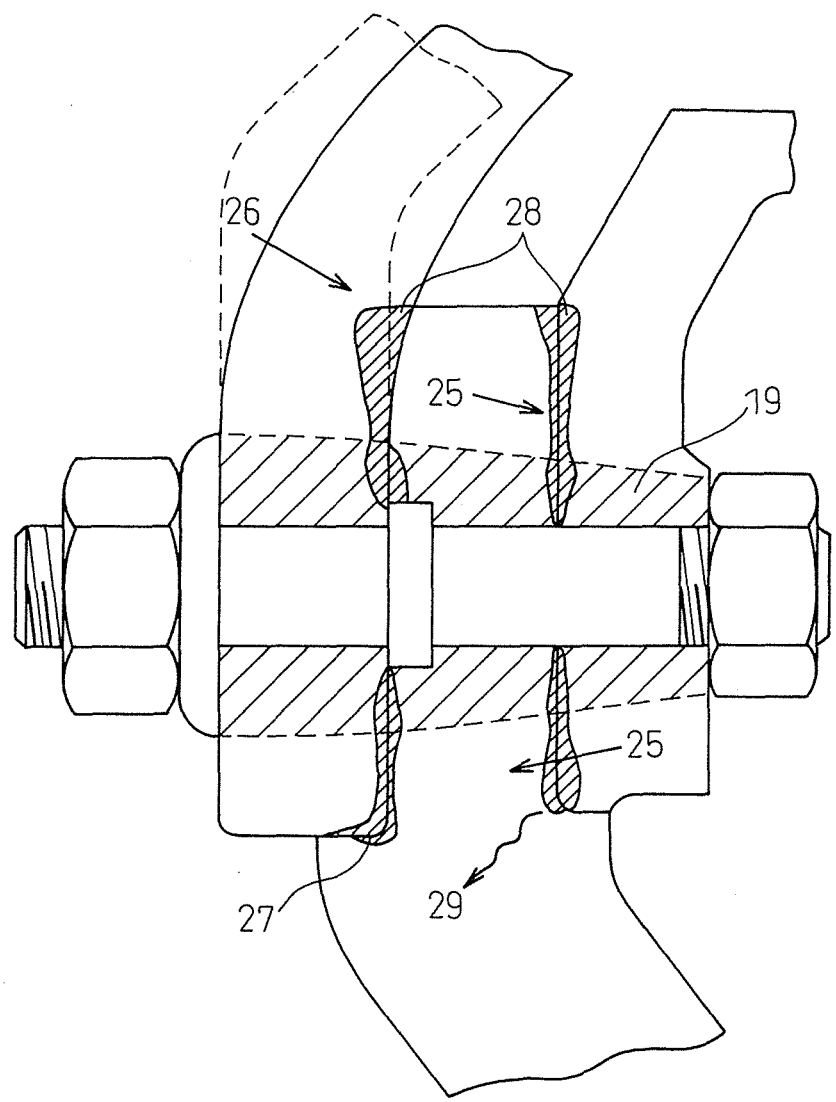
FIG. 4(c) shows the direction of bending of the tire wheel, hub, and brake drum when the ISO type structure of the tire wheel, hub, and brake drum receives stress from the outside to inside of the body.
Figure 4D:
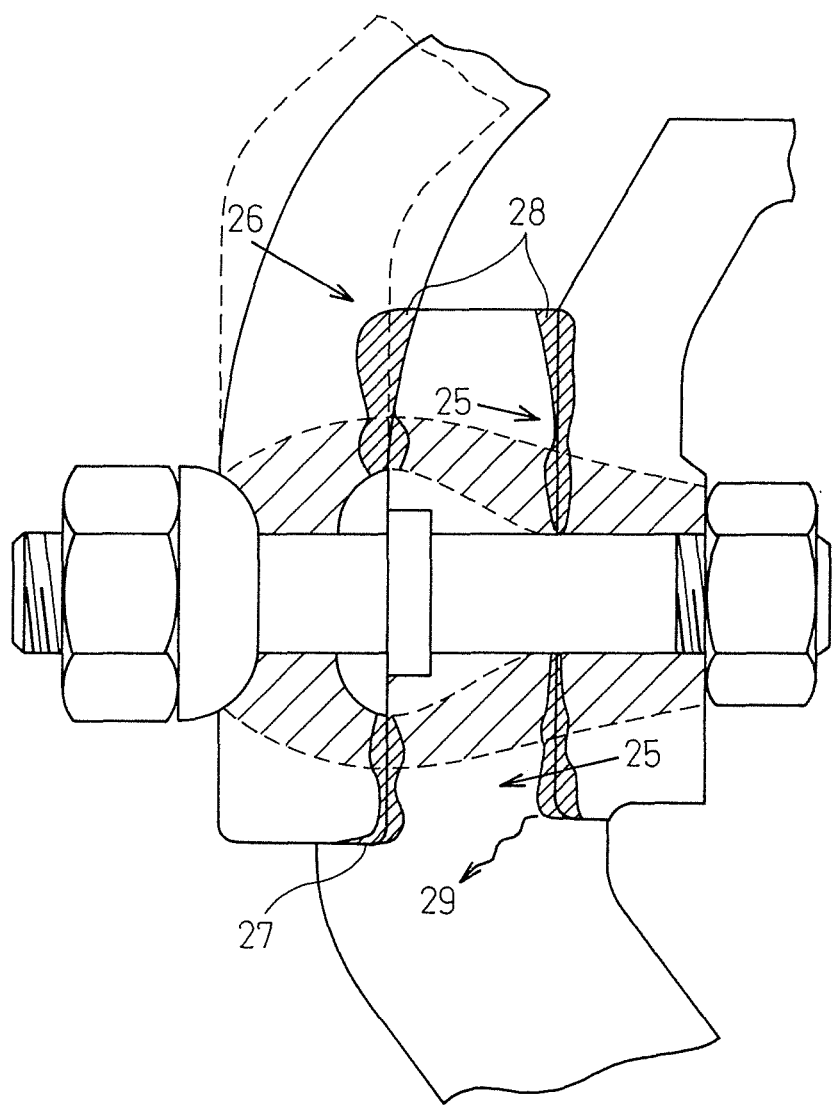
FIG. 4(d) shows the direction of bending of the tire wheel, hub, and brake drum when the JIS type structure of the tire wheel, hub, and brake drum receives stress from the outside to inside of the body.
Figure 5A:
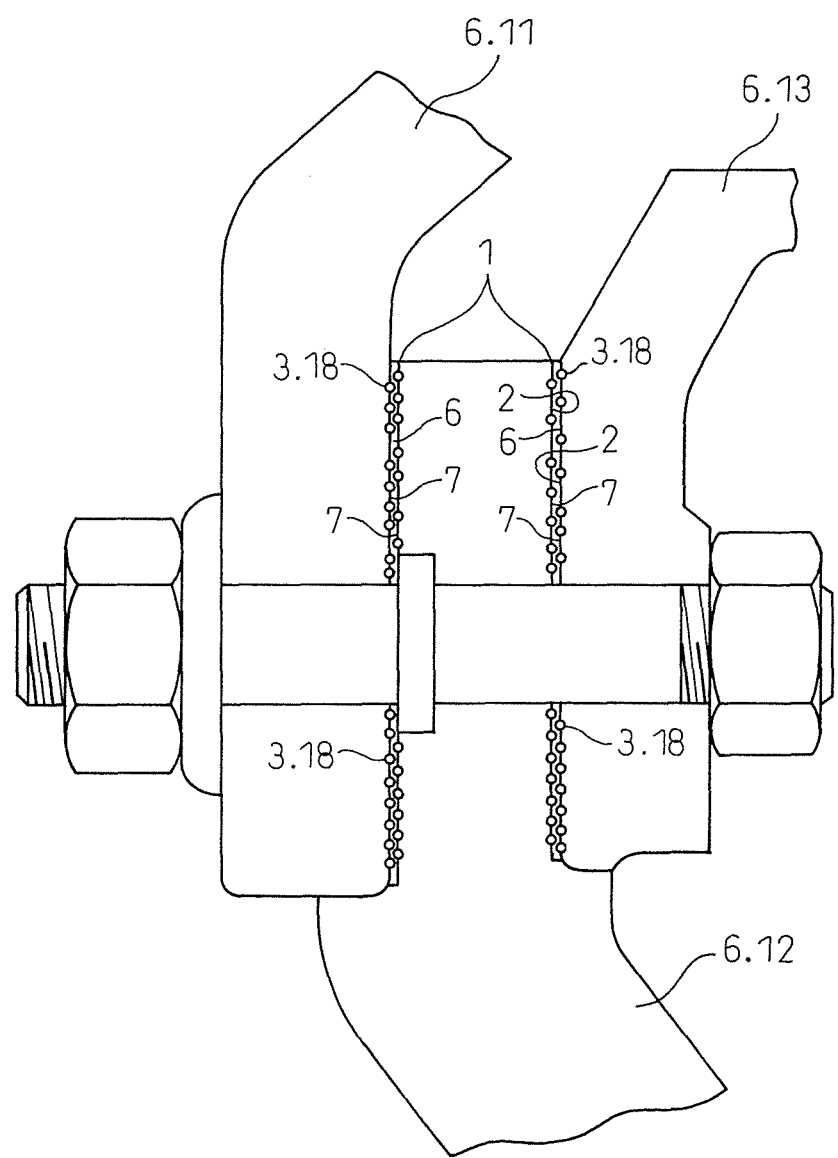
FIG. 5(a) shows the ISO type and FIG. 5(b) shows the JIS type.
Figure 5B:
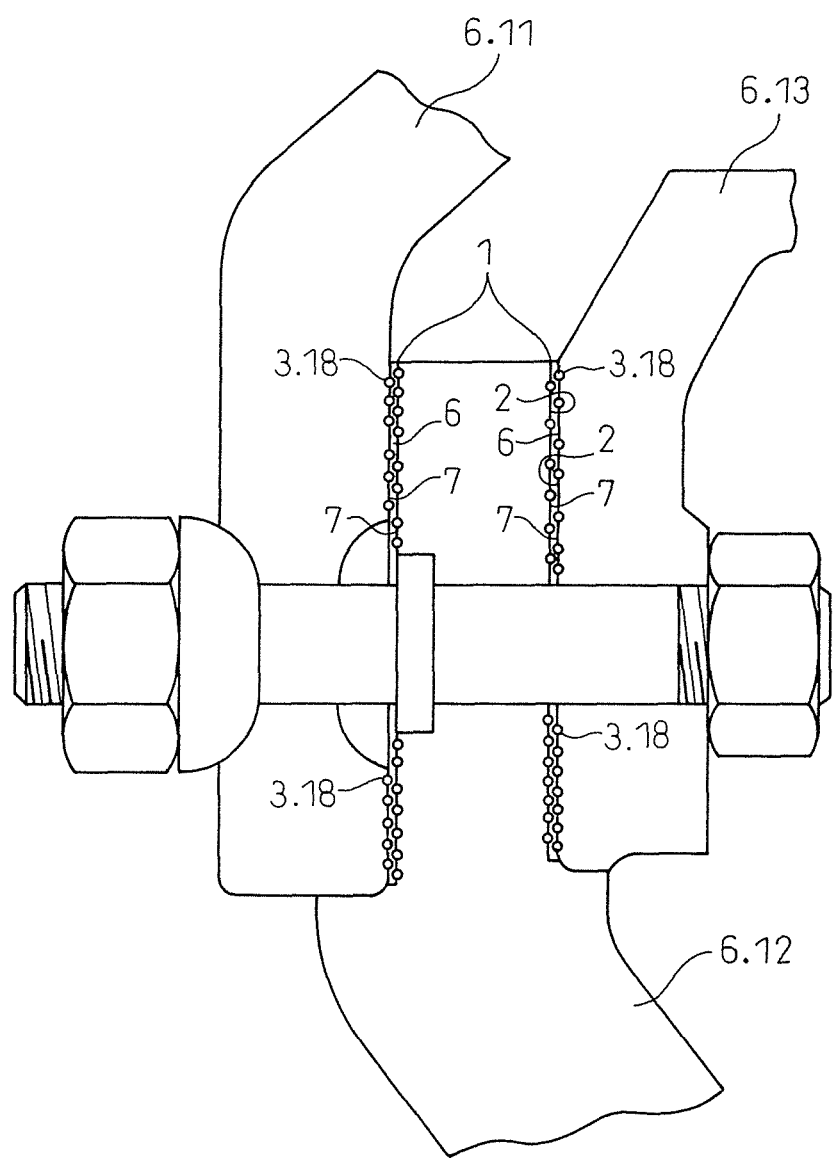

The structure of the tire wheel, hub, and brake drum, as shown in FIGS. 1(a) and (b), is provided with a lock groove 20 for attachment of a stud bolt 14 at the outside of the body of the hub, that is, the tire wheel mounting side (shown in FIG. 2(a) and FIG. 2(b)(1)). Even if the outside of the body and the inside of the body receive the same stress, since the hub 12 has a lock groove 20 for attachment of a stud bolt, the structure of the tire wheel, hub, and brake drum ends up bending to the inside of the body (brake drum side) (shown in FIGS. 4(a), (b), (c), and (d)). FIGS. 4(a) and (c) show the state before the tire wheel, hub, and brake drum receive stress and the tire wheel, hub, and brake drum bend to the inside of the body. Further, FIGS. 4(b) and (d) show the state after the tire wheel, hub, and brake drum bend to the inside of the body. In FIGS. 4(a) and (c) and FIGS. 4(b) and (d), the direction in which the tire wheel is fastened is shown by 24 and the fastening force is shown by 25. Furthermore, the locations where aluminum oxide is formed are shown by 27, while the wear zones are shown by the hatched parts 28. Further, in FIGS. 4(c) and (d), the direction of cracks and fracture is shown by 29.

FIGS. 2(a) and (b)(1) show the range of fastening force lines and direction of action of the fastening force at the time of initial wear when fastening a brake drum to the root of the hub contacting the brake drum. As shown in FIGS. 2(a) and (b)(1), a force 17 acts strongly pushing the brake drum 13 against the root 16 of the hub 12 and fine vibration is received from the automobile engine or the ground surface, so fretting wear occurs and this root 16 ends up becoming thinner. The vicinity of this root is also the most important part in the fastening systems of the tire wheel, hub, and brake drum, but these are fastened tightly at the surroundings, so stress easily concentrates at the root 16. In FIGS. 2(a) and (b)(1), the hatched parts show the range of fastening force lines 19 and the circle mark parts show the locations of formation of aluminum oxide ($Al_2O_3$) at an aluminum tire wheel.

Figure 3A:
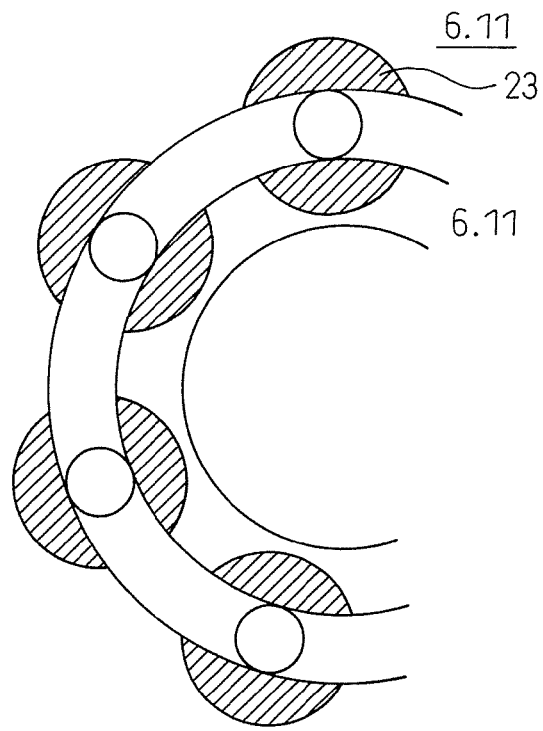
FIG. 3(a) shows an ISO type and FIG. 3(b) shows a JIS type.

However, in the fastening systems of the tire wheel, hub, and brake drum, the front end surfaces 21, 21 of the hub 12 are also abraded. In an automobile or other vehicle right after production, the front end surfaces 21, 21 of the hub are vertical to the fastening bolts, but a hub used for a long time is often worn at the front end surfaces 21, 21 and near the root 16 of the brake drum 13. Specifically, the inside of the range of the force lines of the fastening of the bolts and nuts becomes the range of wear. This wear is a phenomenon called "fretting wear". FIGS. 3(a) and (b) show locations in ISO type and JIS type hubs where wear, so-called fretting wear, easily occurs conceptually by hatched parts 23.

As a result of this fretting wear, the worn parts become thinner and the fastening force drops so excessive stress occurs in the surrounding structure, fatigue fracture easily occurs, and finally the parts break. As an example of such fatigue fracture, cases of cracking of the front wheel hubs of trucks have been reported.

In general, as measures for the above-mentioned truck tire wheel, hub, and brake drum, (1) raising the hardness of the material, (2) increasing the thickness, (3) raising the fastening strength (so as to prevent movement due to vibration), raising the screw strength, and raising the pressing force and other measures are taken. However, the above measures do not reduce the fretting wear. The above (1) makes it difficult to reduce the material of the structures, the above (2) lengthens the time until breakage even with reduction of the material, and (3) similarly prolongs the lifetime. However, even if strongly fastening like in the above (3), the degree of wear also increases.

To increase the above fastening force, the method may be considered of increasing the number of fastening bolts, but if employing this method, it would be necessary to replace parts of vehicles already on the market. Current tire wheels could no longer be used. This method would therefore not be acceptable to the market. Automobile and other vehicle manufacturers could adopt the method of using parts improved in strength for new vehicles or the method of increasing the number of fastening bolts and nuts, but would have to inspect vehicles already on the market before breakage to replace worn parts or take other measures.

The newly provided technology provides a spacer member enabling reduction of fretting wear even with a simple method and members. By inserting spacer members at locations prone to wear at the automobile and other vehicle tire wheels, hubs, and brake drums, the amounts of wear at the tire wheels, hubs, and brake drums etc. are reduced. This newly provided technology provides a film having a low coefficient of friction with the abraded surfaces, flatness, high hardness, and a lubricant holding property and a further an anti-stick property without reducing the fastening force of the tire wheels, hubs, and brake drums. Alternatively, it provides fastened members having a spacer member provided with a film inserted between the abraded surfaces of a tire wheel, hub, and brake drum and a method of insertion in such fastened members. Due to this insertion method, the stress is made to slide by the sliding and vibrating surfaces, so the fastening force lines vertical to the abrading surfaces are not changed and the vibrating parts of the surroundings become easier to slide. Therefore, when bending the abrading surfaces, the tire wheel, spacer member, and hub bend together and therefore the sticking resistance, low coefficient of friction, and other properties can be utilized to reduce wear. In particular, this spacer member 1 does not easily wear down the contact materials 6, for example, the aluminum alloy contact surfaces 7, that is, the attack on the aluminum alloy is small even compared with iron. Even if the aluminum alloy oxidizes and some oxide 18, that is, alumina ($Al_2O_3$), is formed, the fine alumina enters the grooves provided in the covered film at the spacer member 1, so so-called abrasive wear (action and state of abraded material damaging itself) does not easily occur.

Further, the material of the spacer member 1 itself is preferably one which is resistant to rust, which is harder and smoother than the materials of the tire wheel, hub, and brake drum at the two sides of the spacer member, and which has the property of returning to its original shape even after bending. The material of this spacer member is selected considering the materials at the two sides or the overall system.

In the case of the above automobile or other vehicle tire wheels, hubs, and brake drums, SUS301-CSP, SUS304-CSP, and SUS304N2, or other austenite-based stainless steel sheets are selected. The mechanical properties of the materials selected as the spacer member of the present invention are shown in Table 1.

TABLE 1

Mechanical Properties of Aluminum Tire Wheels, Hub Materials, and Spacer Member Materials (Reference)

| | Yield strength N/mm$^2$ | Tensile strength N/mm$^2$ | Elongation % | Hardness HV | Coefficient of friction μ, dried state |
|---|---|---|---|---|---|
| A6061, T6511 | 265 or more | 245 or more | 10 or more | — | Aluminum wheel 0.5 |
| FCD600 | 370 or more | 600 or more | 3 or more | 192-269 (HB) | Hub 0.5 |
| SUS304 | 205 or more | 520 or more | 40 or more | 200 or less | 0.5 |
| SUS304N2 | 345 or more | 690 or more | 35 or more | 260 or less | 0.5 |
| SUS301-CSP1/2H | 510 or more | 930 or more | 10 or more | 310 or more annealing | 0.5 |
| SUS304-CPS1/2H | 470 or more | 780 or more | 6 or more | 250 or more | 0.5 |

The reason for using the SUS301CSP1/2H, SUS304-CSP1/2, etc. shown in Table 1 as the spacer member of the present invention is that they are hard, high in tensile strength, resistant to rust, and resistant to wear even with repeated bending stress such as with use for a spring. Further, the film covered over the surface of the spacer member of the present invention includes films formed by chemical vapor deposition (CVD) or physical vapor deposition (PVD) such as diamond-like carbon film (DLC), boron nitride film, titanium oxide film, and aluminum oxide film, titanium nitride film, titanium carbide film, chrome nitride film, etc. When applying this film, the film surface is formed in advance with regularly or irregularly segmented grooves. Lubricant is injected into these segmented grooves. In accordance with need, this film may also be a smooth surface with no segmented grooves. Due to the regularly or irregularly segmented grooves, even if bending stress is applied, the bending stress is dispersed at the groove parts (parts where film becomes thinner and therefore almost not covered at all), so breakage of the film can be reduced. Furthermore, the film is presegmented to form grooves, so even if several locations of the film (diamond-like carbon film, titanium oxide film, aluminum oxide film, etc.) break, it is possible to reduce the propagation of the fracture leading to the film as a whole breaking.

The diamond-like carbon film (DLC) covered on the spacer member of the present invention is similar to the form of the film described in Japanese Patent Publication (A) No. 2003-147525 and Japanese Patent Publication (A) No. 2007-83726, but the present invention provides a spacer member comprised of regularly (for example, checkered pattern) or irregularly segmented DLC film and grooves. Further, as described in WO/2006/095907A1, by introducing a third substance different from the base material and DLC film in the grooves of the spacer member of the present invention, it is also possible to combine the function of the DLC film and the function of the third substance. In the above prior art, a structure is directly covered by a DLC film, but the spacer member of the present invention is first formed into a shape able to be inserted between structures, the spacer member is covered by a DLC film, then the member is inserted between sliding and vibrating structures.

A first effect of the DLC film with the regularly or irregularly segmented grooves on the spacer member of the present invention is that strain of the base materials of the structures is followed by the DLC film. This is an effect arising due to the regularly or irregularly segmented grooves selectively absorbing the strain applied to the spacer member, so the strain applied to the DLC film being reduced. Even in an indentation test in for example the case of depositing a 1 micron continuous film DLC film on an A1050 standard material, cracks occurred at a push-in depth of 43 microns, while in the regularly or irregularly segmented groove structure of the spacer member of the present invention, in the above indentation test, the DLC film cracked at 74 microns. The second effect is the improvement of the wear resistance by the suppression of abrasive wear. The regularly or irregularly segmented DLC film of the present invention has grooves, so wear particles build up in the grooves. Therefore, abrasive wear becomes harder to occur and as a result, compared with the same grade of DLC film, the actual amount of wear of the regularly or irregularly segmented structures of DLC film after sliding of SUJ2 balls 90,000 times is kept down to less than 35% compared with the continuous film, that is, a large effect of improvement in the wear resistance is obtained.

Example 1

When the automobile engine is started, the engine generates a rotational force. A large torque is applied from the engine to the drive parts and rotational force is transmitted to the coupled drive parts (for example, tire wheels, hubs, and brake drums). The tire wheels, hubs, and brake drums are fastened by bolts and nuts to be able to turn and slide. Therefore, the tire wheels, hubs, and brake drums are abraded around the fastened parts of the bolts and nuts (hatched parts 23 of ISO type of FIG. 3(a) and JIS type of FIG. 3(b)). Due to the abrasion of this peripheral part, first the fastened surfaces are worn, the fastening axial force falls, then the bolts loosen and fracture.

Figure 3B:
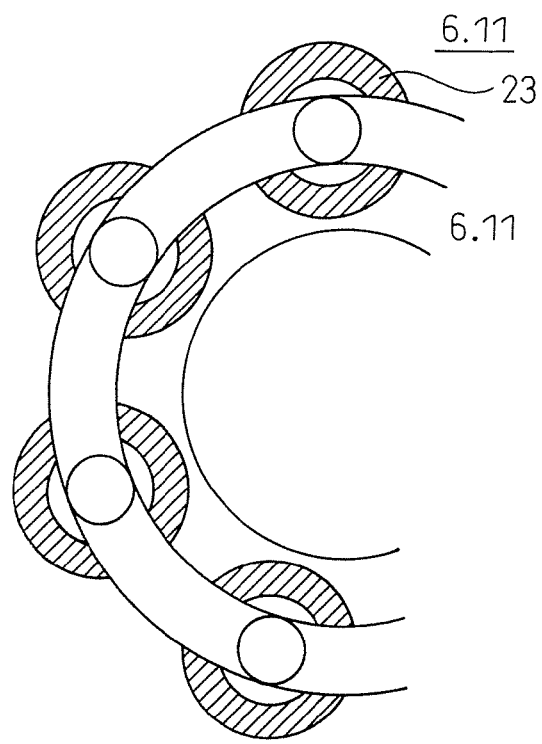

That is, in consideration of the prior art, by experience, the bolt strength is used for design of power transmission, but the surfaces where fretting wear occurs (hatched parts 23 of hub of ISO type of FIG. 3(a) and JIS type of FIG. 3(b)) become uneven, the fastening force falls (bolts and nuts loosen), space is formed at the fastened parts, the fastening force of the fastened parts is lost, and, as a result, the bolts and nuts loosen, so the holes through which the bolts pass and the bolts strike each other, the holes through which the bolts pass deform, and otherwise the fastening ends up easing to the extent that the bolts break or the base material breaks.

Example 2

As another example, when a bearing part in which bearings are press fit and a shaft runs through the center of the bearings etc. is subjected to fine vibration at the shaft of the bearing part in other than the rotational and sliding directions, the balls inside the bearing abrade the inside surface of the outer race or the outer periphery rubs against the surface of the hole and the hole is enlarged and balls fall out or fine stripes of fine wear are formed and detachment occurs. In addition, various wear occurs. In these cases as well, by inserting the spacer member of the present invention for the purpose of reducing abrasion, it is possible to reduce the effects on the members.

Example 3

Structures of aluminum parts (die castings, machined parts, welded structures, etc.) and different metals (iron, copper, stainless steel, cast iron, etc.) placed face to face and fastened by bolts and nuts etc. have been increasing. Recently, passenger cars with bodies made of all aluminum or a chassis made of iron and the top part, trunk hood, engine hood, etc. made of aluminum have appeared. In such a case, the spacer member of the present invention may be inserted between the iron and aluminum for aluminum protection. The effect of reducing the wear of aluminum due to the fine vibration applied to the body without the fastening force being reduced can be expected thereby leading to an improvement in safety. Further, a DLC film is low in electrical conductivity, so the effect of reducing so-called galvanic corrosion can also be anticipated.

Example 4

Figure 6C:
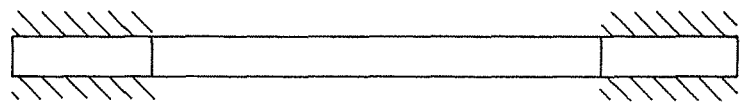
FIG. 6 show various shapes of the spacer member of the present invention, wherein (a) shows an L-section rotary shape, (b) shows a superposed L-section rotary shape, and (c) shows an I-section rotary shape.
Figure 6B:
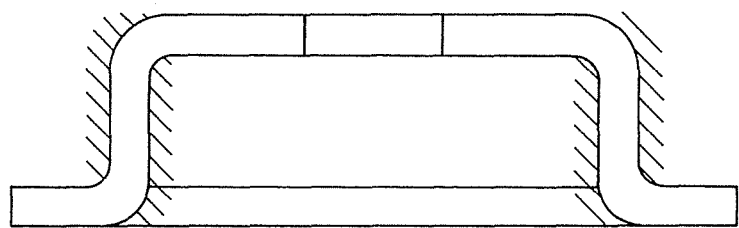
Figure 6A:
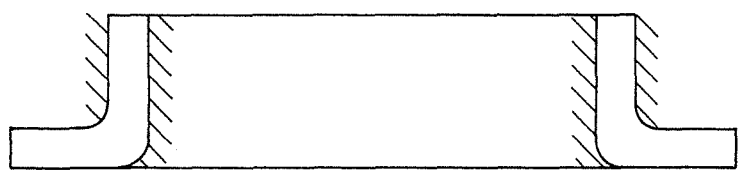

The shape of the spacer member of the present invention is illustrated by the example of mounting to the sliding or vibrating parts of the automobile and other vehicle tire wheel, hub, and brake drum assembly shown in FIG. 1 to FIG. 5, but other used shapes may be the L-section rotary shape as shown in FIG. 6(a), the double L-section rotary shape as shown in FIG. 6(b), the I-section rotary shape as shown in FIG. 6(c), or other various shapes.

The regularly or irregularly segmented covered DLC film of the spacer member and the grooves not covered by the DLC film of the present invention are selected considering both the deformation and tribology (wear) properties of the spacer member. That is, when considering deformation of a spacer member covered by a DLC film, the following points are considered.

1) The ratio t/l of the groove width t and the segmented DLC film size l is preferably raised.

2) When the coverage rate of the DLC film is high, the segmented DLC film size and groove intervals are preferably small.

3) When the spacer member is subjected to local strain, the segmented DLC film size is preferably small.

Further, when considering the tribology (wear) properties of the spacer member covered by the DLC film, the following points are considered.

1) When the abrasive wear is small, the coverage rate of the DLC film should be high.

2) A coverage rate of the DLC film enough to trap wear particles causing abrasive wear is made the upper limit. The size of the segmented DLC film is preferably smaller than the contact width of the sliding or vibrating parts of the spacer member, but the upper limit of the coverage rate of the DLC film is made 60 to 80%.

3) The groove width is determined to an extent where no contact of the rotating members or sliding members of the other structures with the grooves of the DLC film occurs.

4) When contact of the DLC film at the grooves is conceivable, coating the grooves using a lubricant should be studied.

Further, when considering the technology for formation of a DLC film covering the spacer member, the following points are considered.

1) With formation of structured DLC film having segmented grooves by masking, the segmented DLC film size at the time of use becomes 20 μm, and the groove width becomes a minimum of about 20 μm.

2) The larger the segmented DLC film size, the easier the formation.

Summarizing the above points, when making the thickness of the DLC film covering the spacer member provided at a structure of aluminum members 1 μm, a segmented DLC film size of a minimum of 80 μm, a groove width of a minimum of 20 μm, and a DLC film coverage rate of about 64% are considered suitable. However, in the present invention, in accordance with the state of use of the spacer member, the DLC film size, groove width, and coverage rate may be increased about 20% from their above respective values.

On the other hand, when, like with ferrous materials, the spacer member has a Young's modulus of the same extent or more as DLC film (180 GPa), the groove width of the DLC film is preferably made 20 μm or so and the coverage rate of the DLC film is preferably made 70 to 80% or so.

The DLC film covered on the spacer member of the present invention can be fabricated by any of the PVD method or CVD method currently used for formation of DLC films. When formed using a mesh as a mask, application of a uniform voltage to the mesh mask enables the uniformity of the DLC film to be maintained, so formation by CVD using a DC single pulse is suitable. When the size of the tungsten wire through which the voltage is applied is made 30 μm and a 230 μm square mesh mask is used to form a segmented DLC film, the conditions for formation of the shape are as shown below. The formation time when using acetylene as the feed gas, introducing it at 14 cc/min, making the pressure 3 Pa, and applying voltage of −5 kV at a power frequency of 2 kHz was made 1 hour. By the above-mentioned film forming method, a DLC film of about 1 μm thickness is formed. FIG. 7 show the DLC film covered over the spacer member of the present invention prepared using the above mesh mask, wherein FIG. 7(a) shows an electron micrograph and FIG. 7(b) shows a cross-sectional shape.

Note that, when a high adhesive force of the DLC film is required, it is preferable to use argon sputtering to clean the spacer member surface, then introduce tetramethylsilane (Si(CH$_3$)$_4$) in an amount of 14 cc/min and apply a voltage of −5 kV at a pressure 3 Pa and a power frequency of 2 kHz for a period of 5 minutes so as to form an intermediate layer of about 20 nm.

The regularly or irregularly segmented covered DLC film of the spacer member of the present invention and grooves not covered by the DLC film take the form illustrated in FIGS. 7(a) and (b). The segmented DLC film consists of an array of 230 μm square rectangular shapes. Between these rectangular shapes of the DLC film, there are grooves of a depth of about 1 μm corresponding to the film thickness. The irregularly segmented covered DLC film have rounded edges, therefore the segments of DLC film are resistant to concentration of stress in structure.

Example 5

The mechanical properties and physical properties (hardness, coefficient of friction, etc.) of the DLC film formed and covered over the spacer member of the present invention by the above-mentioned method of formation will be described below.

The DLC itself of the regularly or irregularly segmented covered DLC film of the spacer member of the present invention had mechanical properties equivalent to DLC of a continuously covered DLC film structure. The DLC film had a hardness by a nanoindenter of 14 to 20 GPa and a Young's modulus of 150 to 200 GPa. Further, the DLC film had a hydrogen content of 20 to 30 at %. From the Raman spectroscopy of the DLC film, the D band and G band distinctive to DLC are recognized. Furthermore, the results of a ball-on-disk test of the DLC film are shown in FIG. 8. These are the results of measurement for aluminum plate formed with a continuous DLC film structure and regularly or irregularly segmented covered DLC film structures by the method of formation of the present invention. The test conditions were diameter 6 mm SUJ2 balls given a 3.5N load at a 0.1 m/s speed. As shown in FIG. 8, it is learned that the structures of the segmented covered DLC film (segmented DLC-A and B) exhibit stable coefficients of friction lower than a continuous film (continuous DLC). Furthermore, the results of measurement of the relative amount of wear after 90,000 slides were, with a continuous film (continuous DLC), $1.5 \times 10^{-8}$ mm$^3$/N·m and, with segmented covered DLC films (segmented DLC-A and B), $1.2 \times 10^{-8}$ mm$^3$/N·m. Further, if compared by the amount of DLC shaved off, the amount of wear of a continuous film (continuous DLC) was 0.027 mm$^3$, while the amount of wear of a segmented covered DLC film (segmented DLC-A and B) was actually reduced to 0.009 mm$^3$ or ⅓ compared with the continuous DLC. This is the result of suppression of the abrasive wear by making segmented covered DLC film structures (segmented DLC-A and B). Therefore, the wear radius of the ball was also reduced from the 240 μm of the continuous film (continuous DLC) to the 200 μm of the segmented covered DLC film structures (segmented DLC-A and B). The attack on the other member was also greatly improved by making a segmented covered DLC film structure (segmented DLC-A and B).

The results of a bending fatigue test on the fastened structures of the present invention are shown in Table 2. Further, a summary of the bending fatigue test method of fastened structures of the present invention is shown in FIG. 9. At the Al (A6063) side of the fastened structures, there is a DLC film (continuous or segmented DLC film), while at the casting (FCD600, ASTM-A395) side, there is a SUS301-CSP plate surface.

shows the appearance of a segmented DLC shim, where a white powder like substance is seen at a position about 5 mm from the edge of the hole.

Figure 11:
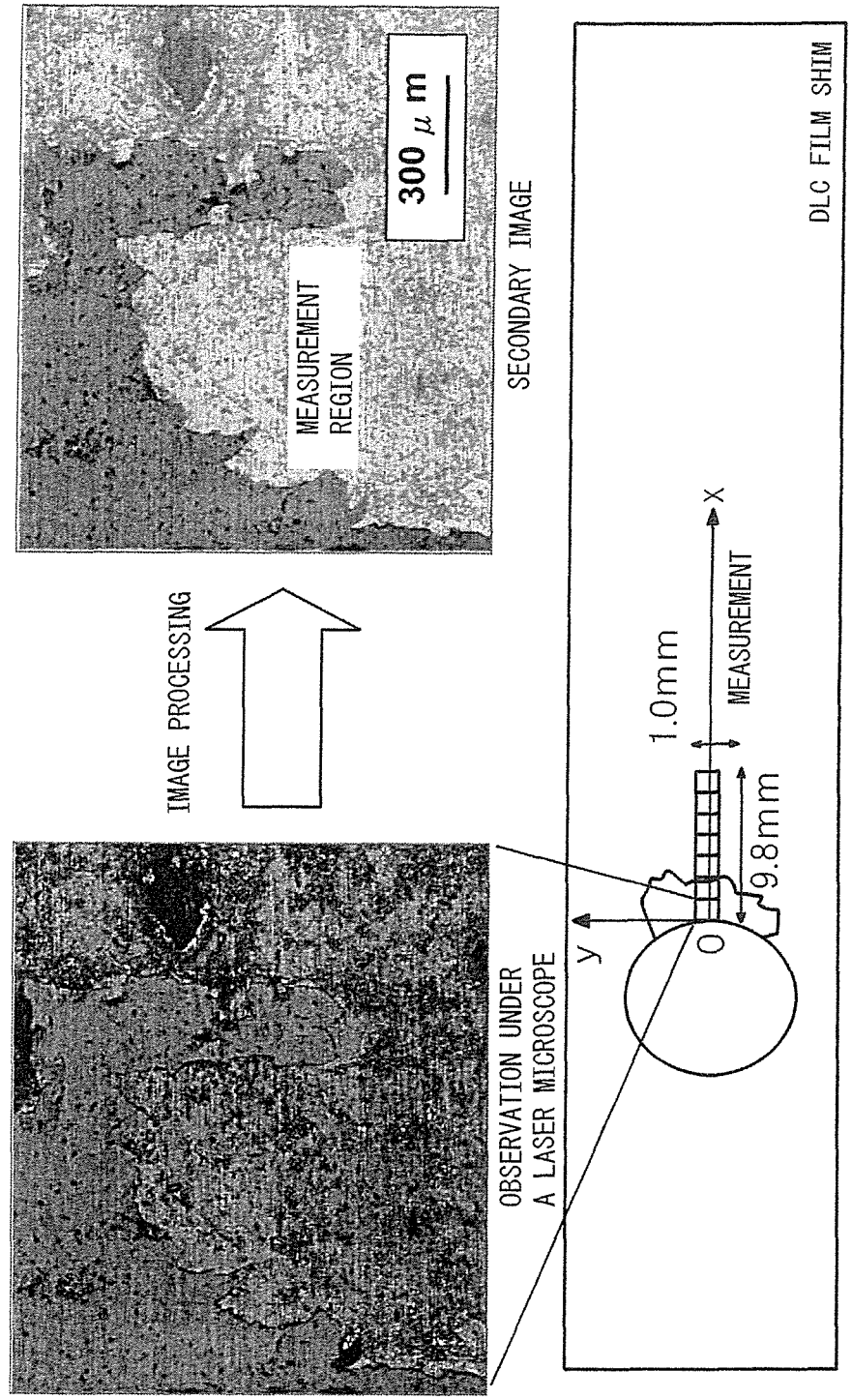
FIG. 11 shows a measurement method and measurement range in an X-direction of peeling of the continuous DLC film.

The measurement method and measurement range of peeling of the DLC film in the X-direction are shown in FIG. 11. As shown in FIG. 11, the measurement region is determined by a secondary image after image processing by observation under a laser microscope. The measurement region of this DLC film, as shown in the figure, measures a range of about 9.8 mm from the hole surface.

FIG. 12 shows the peeling rates of both continuous and segmented DLC films by the distance from edges of the bolt holes. As shown in FIG. 12, the continuous DLC film is peeled off by 70% from 0 to 1.4 mm from the edges of the bolt holes.

FIG. 13 are laser micrographs of both layer peeling of a continuous DLC film (FIG. 13a) and layer peeling of a segmented DLC film (FIG. 13b) and show the maximum peeling parts of both. FIG. 13a shows the part of a continuous DLC film 0 to 1.4 mm from the edges of a bolt hole. FIG. 13b shows the part of a segmented DLC film 2.8 to 4.2 mm from the edges of a bolt hole.

FIG. 14 show a photograph of the state of wear powder by a laser microscope and the results of the above-mentioned analysis of composition. As shown by the peak values of the analysis of composition of FIG. 14 explained above, the wear particles contain oxygen, aluminum, and iron.

The surface roughnesses of a structure comprised of contact materials of an aluminum sheet (or aluminum alloy sheet) and iron (or alloy iron) between which a continuous DLC covered shim is provided (A), a structure provided with a segmented DLC film and shim (B), a structure provided with a film-less shim (C), and a structure comprised of just the above-mentioned two types of contact materials (D) are shown in FIG. 15.

These surface roughnesses become rougher in the order from the structure provided with a segmented DLC film shim (B) as the finest roughness to the structure provided with a continuous DLC film shim (A), a structure provided with a film-less shim (C), and a structure comprised of just the above-mentioned two types of contact materials (D).

Figure 16B:
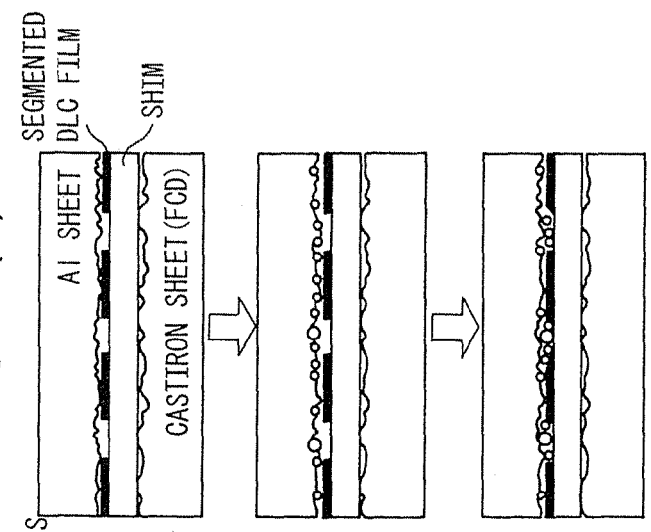
FIG. 16 schematically shows the state before and after wear tests for structures just comprised of two types of contact materials (C), provided with a continuous DLC covered shim (A), and provided with a segmented (segmented structure) DLC film shim (B).
Figure 16A:
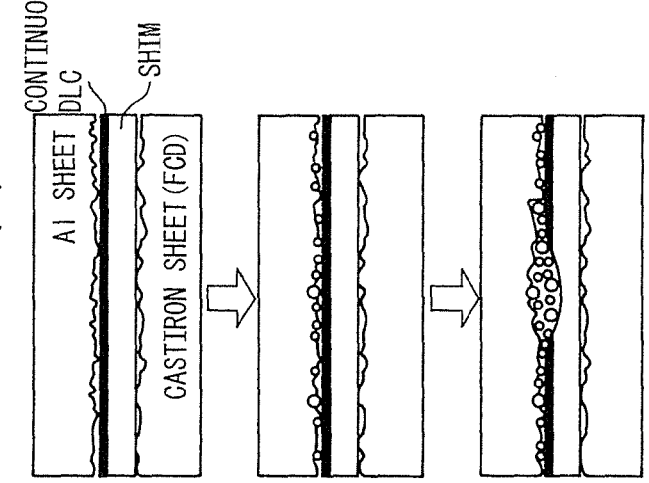
Figure 16C:
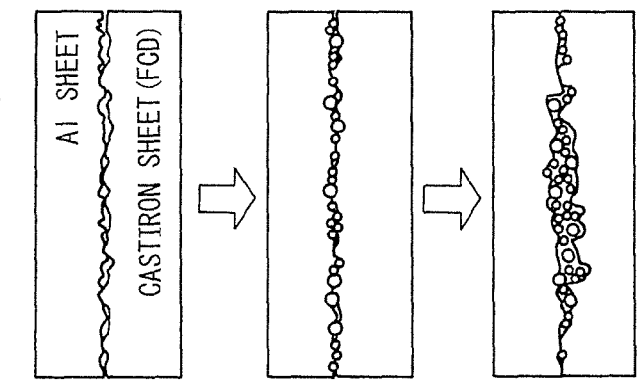

FIG. 16 schematically shows the state before and after wear tests for structures just comprised of two types of contact materials (D), provided with a continuous DLC covered

TABLE 2

Conditions of DLC Covered Shim Inserted Between Surface of FCD600 and Surface of A6063 and Conditions of Bending Test

| No. | Repetitions (×10$^6$) | Max. displacement (mm) | Frequency (Hz) | Load (N) | Specifications of SUS shim plate | Surface roughness of FCD and Al plate before test (μmRa) |
|---|---|---|---|---|---|---|
| 1 | 1.0 | ±1 | 15 | 782 | None | 4.9/2.0 |
| 2 | 1.0 | ±1 | 15 | 920 | Shim with no DLC film (film-less shim)) | 10.8/2.0 |
| 3 | 1.0 | ±1 | 15 | 822 | Shim covered by continuous DLC film at only Al side | 10.8/2.0 |
| 4 | 1.0 | ±1 | 15 | 786 | Shim covered by segmented DLC film at Al side | 10.8/2.0 |

Figure 10A:
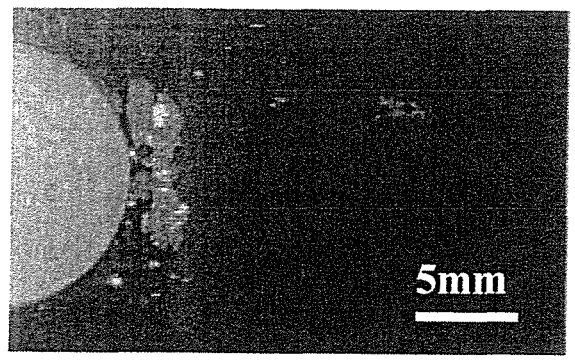
FIG. 10 show the appearance of a shim after performing a bending fatigue test $10^6$ times, wherein (a) shows the appearance of a continuous film DLC shim and (b) shows the appearance of a segmented (segmented structure) film DLC shim.
Figure 10B:
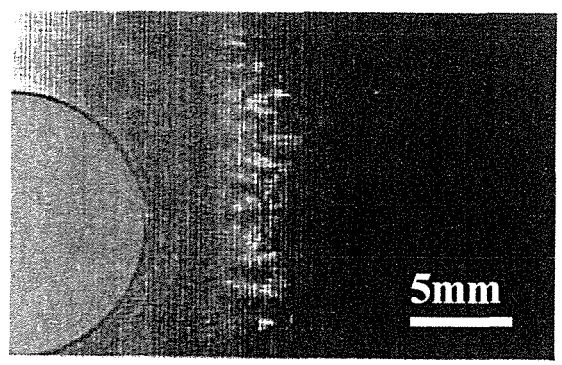

The appearance of a shim after a bending fatigue test conducted 10$^6$ times is shown in FIGS. 10(a) and (b). FIG. 10(a) shows the appearance of a continuous film DLC shim and shows the peeling of the DLC film near a hole. FIG. 10(b)

shim (A), and provided with a segmented DLC film shim (B). The structure just comprised of two types of contact materials (C) shown in FIG. 16 is illustrated with wear particles trapped between the Al alloy sheet and the cast iron sheet (FCD) at the process 2 of formation of flakes due to wear. The structure provided with the continuous DLC film shim (A) shown in FIG. 16 is illustrated with formation and increase of wear particles at the broken parts of the continuous DLC film at the process 2. The structure provided with the segmented DLC film shim (B) shown in FIG. 16 slows the progress of wear since the slight amount of particles formed in the process 2 is caught in the grooves between the segmented parts of the DLC film.

The invention claimed is:

1. A spacer member reducing fretting wear sandwiched between contact surfaces of first and second contact materials subject to abrasion and suffering from wear comprising:

a plurality of sliding or vibrating surfaces having a higher hardness than at least one of the contact surfaces of said first contact material and said second contact material, and a lower coefficient of friction and a higher flatness than at least one of the contact surfaces of said first contact material and said second contact material, wherein said sliding or vibrating surfaces of the spacer member are partially or completely covered by a diamond-like carbon (DLC) film, and wherein said diamond-like carbon (DLC) film is covered over said sliding and vibrating surfaces of the spacer member; and a plurality of segmented grooves on the DLC film configured to accommodate worn particles formed on the spacer member, wherein the groove width of said plurality of grooves is 20 micrometer or more and a coverage rate of the DLC film is 80% or less, and wherein the plurality of segmented grooves are further configured to reduce a strain applied to the DLC film.

2. A spacer member reducing fretting wear as set forth in claim 1, wherein said diamond-like carbon (DLC) film has at least one type of lubricating layer of a solid lubricating layer, liquid lubricant, powder lubricant, and a mixed lubricant of said solid lubricating layer and said liquid and powder lubricants on said groove and sliding and vibrating surfaces.

3. A spacer member reducing fretting wear as set forth in claim 1, wherein said diamond-like carbon (DLC) film is formed by chemical vapor deposition (CVD) or physical vapor deposition (PVD) and said film has a thickness in the range of 300 nanometers to 40 micrometers.

4. A fastened structure comprising the spacer member reducing fretting wear as set forth in claim 1 for sliding or vibrating surfaces of the structure.

5. A fastened structure comprising the spacer member reducing fretting wear as set forth in claim 2 for sliding or vibrating surfaces of the structure.

6. A fastened structure comprising the spacer member reducing fretting wear as set forth in claim 3 for sliding or vibrating surfaces of the structure.

* * * * *